US010511660B2

(12) United States Patent
Keränen et al.

(10) Patent No.: US 10,511,660 B2
(45) Date of Patent: Dec. 17, 2019

(54) METHOD AND NODE FOR SELECTING A MESSAGE BOX (71) Applicant: Telefonaktiebolaget LM Ericsson (publ), Stockholm (SE)

(72) Inventors: Ari Keränen, Helsinki (FI); Nicklas Beijar, Kirkonummi (FI); Anders E Eriksson, Kista (SE); Francesco Militano, Stockholm (SE); Johan Rune, Lidingo (SE); Joachim Sachs, Sollentuna (SE); Vlasios Tsiatsis, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 307 days.

(21) Appl. No.: 15/120,493

(22) PCT Filed: Feb. 21, 2014

(86) PCT No.: PCT/SE2014/050222
§ 371 (c)(1),
(2) Date: Aug. 19, 2016

(87) PCT Pub. No.: WO2015/126299
PCT Pub. Date: Aug. 27, 2015

(65) Prior Publication Data
US 2017/0013059 A1  Jan. 12, 2017

(51) Int. Cl.
*H04W 40/36* (2009.01)
*H04L 29/08* (2006.01)
(Continued)

(52) U.S. Cl.
CPC ......... *H04L 67/1095* (2013.01); *H04W 40/36* (2013.01); *H04W 4/027* (2013.01);
(Continued)

(58) Field of Classification Search
CPC ..... H04W 40/36; H04W 88/16; H04W 4/027; H04W 60/00; H04W 48/17; Y02D 70/1262
See application file for complete search history.

(56) References Cited

U.S. PATENT DOCUMENTS

2004/0033811 A1 * 2/2004 Tsai ............... H04M 3/53325
455/554.1
2010/0075677 A1 * 3/2010 Wang ............... H04W 36/0055
455/436
(Continued)

FOREIGN PATENT DOCUMENTS

EP  1418731 A1  5/2004
EP  1876767 A1  1/2008
(Continued)

OTHER PUBLICATIONS

3GPP TS 23.682 V11.3.0 (Dec. 2012), "Architecture enhancements to facilitate communications with packet data networks and applications," 3rd Generation Partnership Project; Technical Specification Group Services and System Aspects, (Release 11), Dec. 2012, 29 pages.
(Continued)

*Primary Examiner* — Tom Y Chang
(74) *Attorney, Agent, or Firm* — NDWE LLP (57) ABSTRACT

A method in a node of a communication system for selecting a message box for a machine device. The communication system comprises one or more capillary networks and a wireless network, the one or more capillary networks comprising one or more machine devices and at least two capillary network gateways. The at least two capillary network gateways are capable of data exchange between the machine device and the wireless network. The method comprises establishing, for the machine device, a first probability reflecting the probability that the machine device (Continued)

changes capillary network gateway between two consecutive data transmission events performed by the machine device, and selecting, based on the first probability, a message box for use by the machine device. Further described are a corresponding node, computer programs and computer program products.

37 Claims, 4 Drawing Sheets

(51) Int. Cl.
    *H04W 4/02*     (2018.01)
    *H04W 48/00*     (2009.01)
    *H04W 60/00*     (2009.01)
    *H04W 88/16*     (2009.01)

(52) U.S. Cl.
    CPC ............ *H04W 48/17* (2013.01); *H04W 60/00* (2013.01); *H04W 88/16* (2013.01)

(56) References Cited

U.S. PATENT DOCUMENTS

| | | | |
|---|---|---|---|
| 2011/0110336 A1 | 5/2011 | Takamura | |
| 2011/0228750 A1* | 9/2011 | Tomici | H04W 8/082 |
| | | | 370/338 |
| 2011/0256870 A1* | 10/2011 | Park | H04W 36/30 |
| | | | 455/436 |
| 2012/0238272 A1 | 9/2012 | Hwang et al. | |
| 2014/0355542 A1* | 12/2014 | Zhang | H04W 4/027 |
| | | | 370/329 |
| 2015/0201360 A1* | 7/2015 | Ray Chaudhuri | H04W 36/30 |
| | | | 455/436 |

FOREIGN PATENT DOCUMENTS

| | | |
|---|---|---|
| EP | 2315416 A1 | 4/2011 |
| JP | H10313361 A | 11/1998 |
| JP | 2005526416 A | 9/2005 |
| JP | 2009507441 A | 2/2009 |
| WO | 2012136005 A1 | 10/2012 |

OTHER PUBLICATIONS

Vial M., "CoRE Mirror Server," draft-vial-core-mirror-proxy-01, Intended status: Standards Track, Jul. 13, 2012, 19 pages.
International Preliminary Report on Patentability for Application No. PCT/SE2014/050222 dated Aug. 23, 2016, 7 pages.
Notice of Reasons for Rejection from foreign counterpart Japanese Patent Application No. 2016-552890, dated Nov. 17, 2017, 5 pages.
International Search Report and Written Opinion for Application No. PCT/SE2014/050222, dated Feb. 5, 2015, 10 pages.

* cited by examiner

METHOD AND NODE FOR SELECTING A MESSAGE BOX

CROSS-REFERENCE TO RELATED APPLICATIONS

This application is a National stage of International Application No. PCT/SE2014/050222, filed Feb. 21, 2014, which is hereby incorporated by reference.

TECHNICAL FIELD

The technology disclosed herein relates generally to the field of capillary networks, and in particular to message boxes in such capillary network.

BACKGROUND

A currently foreseen development of communication in cellular networks involves numerous small autonomous devices, which transmit and receive only small amounts of data (or are polled for data) occasionally, e.g. once a week or once per minute. These devices are sometimes referred to as Machine Type Communication (MTC) devices, Machine-to-Machine (M2M) devices or just Machine Devices (MDs), and are assumed not to be associated with humans, but are rather sensors or actuators of different kinds, which communicate with application servers within or outside the cellular network. The application server configures and receives data from the MTC devices. Hence, this type of communication is often referred to as machine-to-machine (M2M) communication.

So far focus has been directed to MDs being directly connected to the cellular network via the radio interface of the cellular network. However, a scenario which is likely to be more prevalent is that MDs connect to the cellular network via a gateway. In such scenarios the gateway acts like a UE towards the cellular network while maintaining a local network, typically based on a short range radio technology towards the MDs. Such a local network, which in a sense extends the reach of the cellular network (to other radio technologies but not necessarily in terms of radio coverage), has been coined capillary network and the gateway connecting the capillary network to the cellular network is referred to as a capillary network gateway (CGW).

Figure 1:
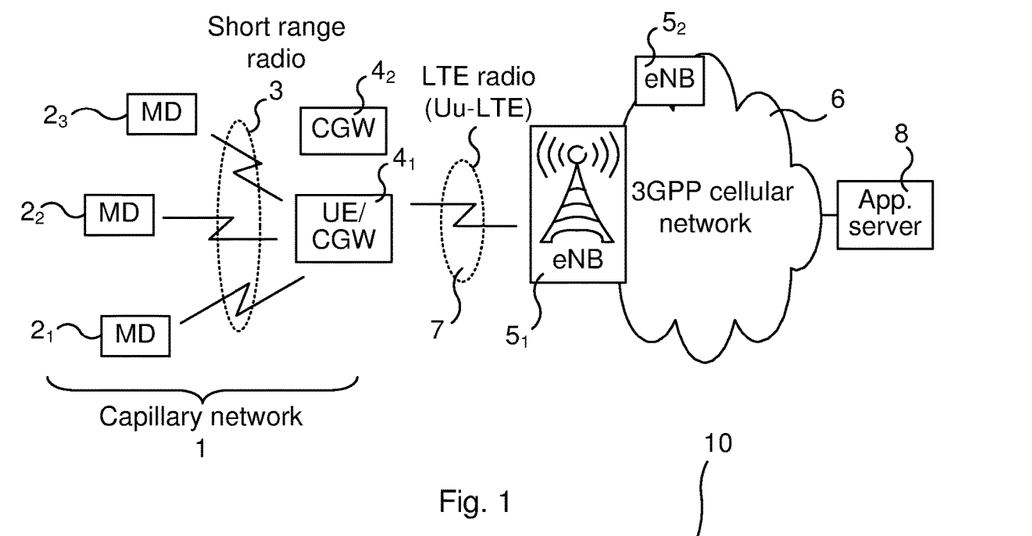
FIG. 1 illustrates schematically a capillary network and a cellular network.

FIG. 1 illustrates such capillary network 1, comprising a number of machine devices $2_1$, $2_2$, $2_3$ communicating with a CGW $4_1$, $4_2$ over a first air interface 3 typically implementing a short range radio technology. The CGWs $4_1$, $4_2$ are in turn communicating with a node $5_1$, $5_2$ of the cellular network 6 over a second air interface 7. An application server 8 is also illustrated. The MDs $2_1$, $2_2$, $2_3$ are typically relayed to such an application server 8 through the cellular network 6, whereby the MDs $2_1$, $2_2$, $2_3$ are able to exchange data with applications of the application server 8.

In most cases, the MDs have to be very energy efficient, as external power supplies are typically not available and since it is neither practically or economically feasible to frequently replace or recharge their batteries. The MDs are therefore often configured to enter a low-power mode (also denoted sleep mode).

When this sleeping nature of MDs $2_1$, $2_2$, $2_3$ is combined with a feature of them also being mobile, some difficulties may arise. In particular, when the MD $2_1$, $2_2$, $2_3$ is both sleeping and mobile, there are several possible scenarios upon the MD $2_1$, $2_2$, $2_3$ awakening from its sleeping mode. It may end up attaching to the same CGW $4_4$, $4_2$ that it was last attached to, or it may attach to a different CGW $4_1$, $4_2$, which is attached to the same node $5_1$, $5_2$ as the previous CGW $4_1$, $4_2$, or it may attach to a completely different CGW $4_1$, $4_2$ attached to a different node $5_1$, $5_2$. Information on reachability of the MD $2_1$, $2_2$, $2_3$ could therefore change in an unpredictable way.

While the MD is sleeping and moving, applications using the MD may need to send commands or information to the MD and would therefore need to know the reachability and availability information of the MD at the time of the upcoming transmission. However, the MD is unable to keep track of all the possible applications that may be programmed to contact it directly, e.g. as new applications may be added, nor can the MD update these applications with the reachability information when it wakes up, e.g. since the application may be configured to transmit at certain times and cannot wait for a current location.

From the above it is realized that reachability information management protocols, e.g. having information on the last known location and attachment of the MD, may be inefficient especially when MD is both sleeping and mobile.

A rendezvous function for applications as well as MDs has been introduced in the architecture. In particular, Internet Engineering Task Force (IETF) has introduced a Mirror Server function that acts as a mirror for sensor and actuation resources hosted on sleeping MDs. The MD may send its data to the mirror server when it is awake, and the application may retrieve this data at is own availability. The mirror server function thus allows applications to retrieve the last known value of a resource hosted on a sleeping MD. The mirror server function is placed in a cloud comprising the cellular network 6 and any external service provider's networks.

SUMMARY

Depending on the applications, the MDs can be static or mobile with mobility ranging from low to high. Even when the MD is static it may change its attachment CGW, e.g. for load balancing reasons or changing channel characteristics. In view of the MTC being an energy constrained device, it needs to communicate in as efficient manner as possible. One way of rendering the communication efficient may be to arrange the communicating end parts as close to each other as possible. For example, a message box, e.g. in line with the function provided by a mirror server, located in a node close to the MD would reduce the communication time and thus prolong the sleep time for the MD.

However, in view of the mobility of the MD and lack of reachability information, a location high up in the network, in particular above a mobility anchor node handling mobility information would be preferred in order to ensure that the application can retrieve data from the message box. There is thus a tradeoff between the desire to reduce energy usage of the MDs and guaranteeing reachability of data from mobile, energy constrained MDs.

An object of the present disclosure is to solve or at least alleviate at least one of the above mentioned problems.

The object is according to a first aspect achieved by a method performed in a node of a communication system for selecting a message box for a machine device, the communication system comprising one or more capillary networks and a wireless network. The one or more capillary networks comprises one or more machine devices and at least two capillary network gateways, the at least two capillary network gateways being capable of data exchange between the machine device and the wireless network. The method comprises:
- establishing, for the machine device, a first probability reflecting the probability that the machine device changes capillary network gateway between two consecutive data transmission events performed by the machine device, and
- selecting, based on the first probability, a message box for use by the machine device.

The method enables selection of a message box for a machine device wherein characteristics of the machine device are taken into account. In particular, if the machine device is highly mobile, i.e. its data transmissions are likely to be received by different capillary network gateways at different instances in time, then a message box located rather high up in the wireless network may be selected for it. Thereby it is ensured that an application can reach it, or at least its data, even in case of change of e.g. radio access network node. On the other hand, for a machine device moving less, its data transmissions are likely to be received by the same capillary network gateway each time, and a location of the message box close to it may therefore be selected. Thereby a minimized round trip delay is provided, which in turn enables the machine device to enter a low power mode, thus saving energy resources thereof. The method thus provides a best possible location of the message box for each machine device in view of the mentioned tradeoff of energy usage versus reachability.

The object is according to a second aspect achieved by a node of a communication system configured to select a message box for a machine device. The communication system comprises one or more capillary networks and a wireless network, wherein the one or more capillary networks comprise one or more machine devices and at least two capillary network gateways. The at least two capillary network gateways are capable of data exchange between the machine device and the wireless network. The node comprises a processor and memory, the memory containing instructions executable by the processor, whereby the node is operative to:
- establish, for the machine device, a first probability reflecting the probability that the machine device changes capillary network gateway between two consecutive data transmission events performed by the machine device, and
- select, based on the first probability, a message box for use by the machine device.

The object is according to a third aspect achieved by a computer program for a node of a communication system for selecting a message box for a machine device, the communication system comprising one or more capillary networks and a wireless network, wherein the one or more capillary networks comprise one or more machine devices and at least two capillary network gateways. The at least two capillary network gateways are capable of data exchange between the machine device and the wireless network. The computer program comprises computer program code, which, when run on the node causes the node to:
- establish, for the machine device, a first probability reflecting the probability that the machine device changes capillary network gateway between two consecutive data transmission events performed by the machine device, and
- select, based on the first probability, a message box for use by the machine device.

The object is according to a fourth aspect achieved by a computer program product comprising a computer program as above, and a computer readable means on which the computer program is stored.

The object is according to a fifth aspect achieved by a node of a communication system for selecting a message box for a machine device of a capillary network comprising at least two capillary network gateways. The node comprises:
- means for establishing, for the machine device, a first probability reflecting the probability that the machine device changes capillary network gateway between two consecutive data transmission events performed by the machine device, and
- means for selecting, based on the first probability, a message box for use by the machine device.

Further features and advantages of the present disclosure will become clear upon reading the following description and the accompanying drawings.

DETAILED DESCRIPTION

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

Figure 2:
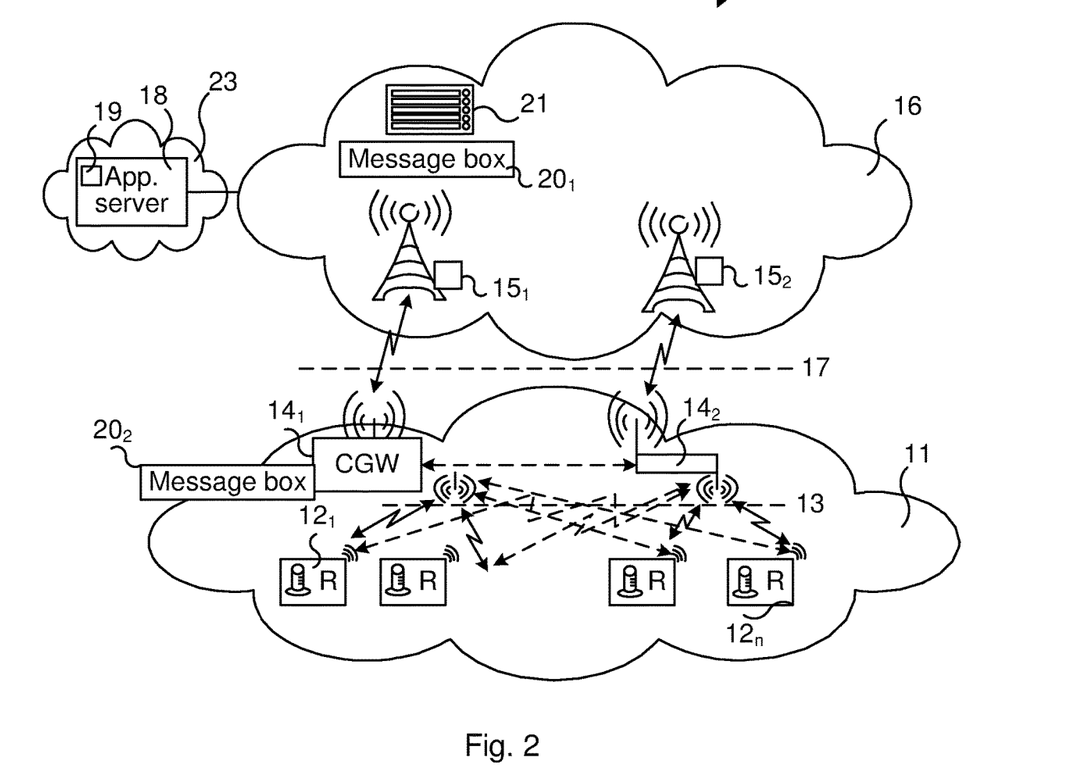
FIG. 2 illustrates an environment in which embodiments of the present disclosure may be implemented.

FIG. 2 illustrates an environment in which embodiments of the present disclosure may be implemented. It is initially noted that embodiments of the present disclosure are mainly described and exemplified by using LTE as the radio access technology over the air interface between the CGW and the cellular network (also denoted wireless network in the following). The teachings of the present disclosure may however be applied also to other radio access technologies, such as e.g. Global System for Mobile Communications (GSM) or Universal Mobile Telecommunications System (UMTS).

FIG. 2 thus illustrates a communication system 10 in which embodiments of the present disclosure may be implemented. The communication system 10 comprises one or more capillary networks 11 (only one illustrated) and a wireless network 16 and possibly an external packet data network (PDN) 23. The PDN 23 may e.g. comprise a third party service provider's network (e.g. owned by a service provider other than the operator of the wireless network 16), i.e. it may be an operator external public or private PDN or an intra operator PDN, e.g. for provisioning IP Multimedia Subsystem (IMS) services. Such PDN 23 may for instance be the Internet. It is noted that the communication system 10 may comprise any number of capillary networks (although only one is illustrated in FIG. 2). A capillary network may be defined in different ways, e.g. based on its various connectivity abilities. A capillary network may for example be seen as any kind of extension of a cellular network (e.g. 3GPP network) changing radio access technology (compared to the cellular network).

The capillary network 11 comprises one or more Machine Type Communication devices (MTC devices), which in the following are denoted machine devices (MDs) $12_1, \ldots, 12_n$. The capillary network 11 further comprises one or more capillary network gateways (CGWs) $14_1, 4_2$. The MDs $12_1, \ldots, 12_n$ are capable to (e.g. configured to) communicate with the CGW $14_1, 13_2$, and/or with other MDs $12_1, \ldots, 12_n$ over a first air interface 13 (schematically illustrated by the dashed line 13). The first air interface 13 may implement a short range radio technology, such as for example IEEE 802.15.4 (e.g. with 6LoWPAN or ZigBee as the higher layers), Bluetooth Low Energy or low energy versions of the IEEE 802.11 family, (i.e. Wireless Local Area Networks, or WiFi). In FIG. 2, the communication over this first air interface 13 is illustrated by the various arrows between the MDs $12_1, \ldots, 12_n$ and between the MDs $12_1, \ldots, 12_n$ and the CGWs $14_1, 14_2$. The MDs $12_1, \ldots, 12_n$ may for example comprise metering devices, actuators or sensors, e.g. electricity meters.

Two CGWs that are not directly connected to each other (e.g. do not interface each other directly), may be considered to belong to different capillary networks, or considered to belong to the same capillary network e.g. if connected to same Packet Data Network Gateway. Aspects of the present disclosure are applicable to various cases, in which there is a need for selection of CGW. Examples of such cases comprise two or more capillary networks each comprising one CGW, one capillary network comprising two or more CGWs, or a combination thereof. In the following, a single capillary network comprising two or more CGWs is used for describing aspects of the disclosure, but it is to be noted that other set-ups are possible and within the scope of the present disclosure.

Although not illustrated, the capillary network 11 may comprise a multi-hop network, i.e. some MDs $12_1, \ldots, 12_n$ may have to communicate via one or more other MD(s) $12_1, \ldots, 12_n$ to reach a CGW $14_1, 4_2$. This is often the case e.g. for an IEEE 802.15.4+ZigBee network with the CGW $12_1, 12_2$ acting as a Personal Area Network (PAN) controller. Aspects of the present disclosure are applicable to both such set-ups of the capillary network 11. In the multi-hop case, a routing protocol, such as Routing Protocol for Low-Power and Lossy Networks (RPL), may be used. It is noted that the RPL may, in principle, be used also in single hop networks, although there is typically no need for a routing protocol in such networks.

The CGWs $14_1, 14_2$ are in turn capable to (e.g. configured to) communicate not only with the MDs $12_1, \ldots, 12_n$ but also with a radio access node $15_1, 15_2$ of the wireless network 16 over a second air interface 17 (illustrated by the dashed line 17). When the wireless network 16 is an LTE network, the node may e.g. be an evolved node B (eNB), and the second air interface 17 is then the LTE-Uu-interface. The communication over the second air interface 17 is illustrated by the arrows between the CGWs $14_1, 14_2$ and the nodes $15_1, 15_2$ of the wireless network 16. The CGWs $14_1, 14_2$ are thus interfacing both the MDs $12_1, \ldots, 12_n$ and the wireless network 16. The wireless network 16 may comprise an LTE network, but may alternatively be another type of network, as mentioned earlier.

The wireless network 16 may typically be seen as comprising a radio access network (RAN) and a core network, the RAN and the core network comprising various network nodes. The RAN (denoted E-UTRAN in LTE, for Evolved Universal Terrestrial RAN) may comprise nodes such as the mentioned radio access nodes, e.g. eNBs in case of LTE. The core network (known as Evolved Packet Core, EPC, for LTE) may comprise nodes such as e.g. Mobility Management Entity (MME) and packet data network gateway (PDN-GW, or P-GW) (also refer to FIG. 3 for exemplary nodes of the wireless network 16).

An application server 18 is also illustrated in FIG. 2 comprising one or more applications 19. The application server 18 may be part of the wireless network 16, or be part of the PDN 23 connected to the wireless network 16. The application server 18 comprises applications 19 which may configure the MDs $12_1, \ldots, 12_n$ to e.g. perform a certain action such as perform a reading and send a reading value to it.

In an aspect of the present disclosure, several message boxes $20_1, 20_2$ are introduced, which message boxes $20_1, 20_2$ may be selected for a particular MD $12_1, \ldots, 12_n$. The message boxes $20_1, 20_2$ for use by a MD $12_1, \ldots, 12_n$ may be located within the communication system 10, e.g. in the capillary network 11 or in the wireless network 16. The message box $20_1, 20_2$ may for example comprise a function, corresponding to the mirror server function mentioned earlier. The message box may be a server that stores messages sent to or from an MD $12_1, \ldots, 12_n$, in a fashion similar to an email server. The message box may be a server, virtual machine or simply a process running on a server or virtual machine. The message box may be capable to store messages that are sent to it and also capable to send, on request, messages that it is storing. The message box may also allow discovering messages that it is storing. In order to store messages, the message box may comprise storage capacity, e.g. memory. The message box comprises one or more interfaces for its interaction with e.g. the wireless network 16.

Briefly, for the purposes of the present disclosure, it is thus assumed that there are multiple potential locations of the message box $20_1, 20_2$ for a particular MD $12_1, \ldots, 12_n$. Such location may be in a new entity, denoted Capillary Network Function (CNF) indicated at reference numeral 21 in FIG. 2, in a node of the wireless network 16, e.g. a PND-GW, and/or in one or more of the CGWs 14042. For each MD $12_1, \ldots, 12_n$, depending on its specific situation and behavior, e.g. whether it is static or not or is changing CGW $14_1, 14_2$ often or not, etc., the location that is most favorable for the message box may be different. The most favorable (optimal in some sense) location may be a location that minimizes the Round Trip Time (RIM. In an aspect of the present disclosure, the decision on which message box the MD $12_1, \ldots, 12_n$ should use may therefore be based on the probability of the MD $12_1, \ldots, 12_n$ doing a CGW re-selection, and a parameter denoted herein as "CGW re-selection probability" may be used to select a location for the message box $20_1, 20_2$.

Once the CGW re-selection probability is calculated, some MDs $12_1, \ldots, 12_n$, e.g. the static ones, may use a message box $20_2$ in the capillary network 11, e.g. in a CGW $14_1$; other MDs $12_1, \ldots, 12_n$ (e.g. the ones that are not static) may use the message box $20_1$ in the CNF 21 or elsewhere in the wireless network 16.

The message box $20_1$ for a (highly) mobile MD $12_1, \ldots, 12_n$, may be located at or above a mobility anchor point (MAP), in the present description also denoted mobility anchor node. Such mobility anchor point keeps track of the current address of the (mobile) MDs $12_1, \ldots, 12_n$ and forwards the data packets to that MD $12_1, \ldots, 12_n$. An example of a MAP is a Serving GateWay (S-GW) (also refer to FIG. 3 and related text). A correspondent host that wants to communicate with a mobile MD $12_1, \ldots, 12_n$ sends data packets to the fixed mobility anchor point of that MD $12_1, \ldots, 12_n$.

Figure 3:
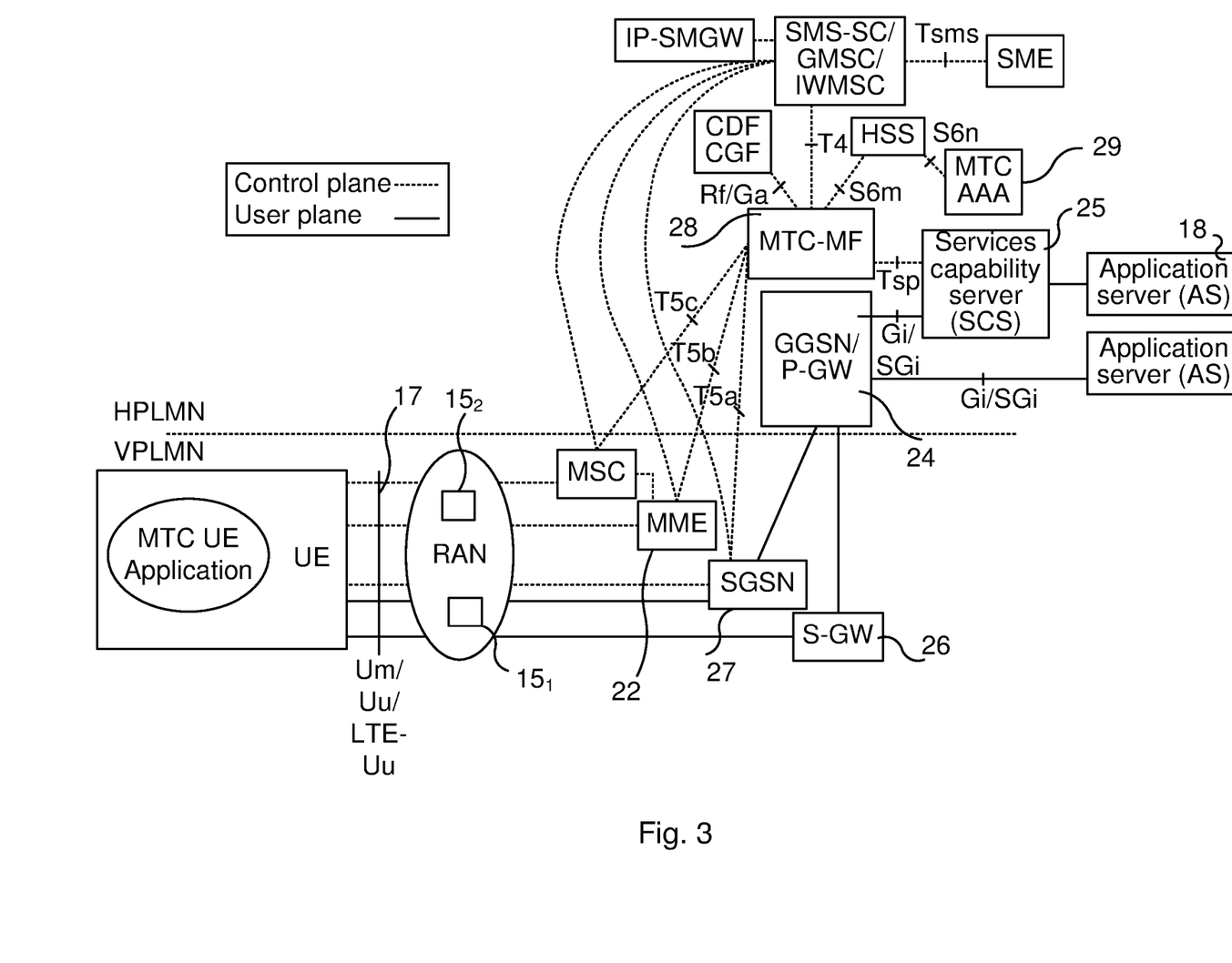
FIG. 3 illustrates a communication system in which embodiments of the present disclosure may be implemented.

FIG. 3 illustrates a schematic overview of an exemplifying wireless network 16 in which embodiments of the present disclosure can be implemented. The wireless network 16 illustrated in FIG. 3 is an LTE based network. It is noted that the terms "LTE" and "LTE based" system is here used such as to encompass both present and future LTE based systems, such as, for example, advanced LTE systems. It should be appreciated, and as mentioned earlier, that although FIG. 3 illustrates a wireless network 16 in the form of an LTE based system, the example embodiments described herein may also be utilized in connection with other wireless communication systems, such as e.g. GSM or UMTS, comprising nodes and functions that correspond to the nodes and functions of the wireless network 16 in FIG. 3.

The wireless network 16 comprises one or more base stations in the form of eNodeBs $15_1$, $15_2$, operatively connected to a Serving Gateway (SGW) 26, in turn operatively connected to a Packet Data Network Gateway (PGW)/Gateway General Packet Service Support Node (GGSN) 24. It is noted that the P-GW and GGSN may alternatively be separate nodes. The SGW 26 routes and forwards user data packets over the $S_1$-U interface, whilst also acting as the mobility anchor for the user plane during inter-eNodeB handovers and as the anchor for mobility between LTE and other 3rd Generation Partnership Project (3GPP) technologies (terminating $S_4$ interface and relaying the traffic between 2G/3G systems and PGW). Among other things, the SGW 26 manages and stores UE contexts (the CGW is acting as a UE towards the wireless network 16), e.g. parameters of the Internet Protocol (IP) bearer service, and network internal routing information. Further, the wireless network 16 may comprise a Serving General Packet Service Support Node (SGSN) 27, a Services Capability Server (SCS) 25, a Machine Type Communication Inter Working Function (MTC-IWF) node 28, and a MTC Authentication, Authorization and Accounting (AAA) node 29.

The PGW 24 provides connectivity for the CGW to external packet data networks (PDNs, not explicitly illustrated in FIG. 3, but the application server 18 may, as mentioned earlier, be part of such PDN) by being the point of exit and entry of traffic for the CGW. A CGW may have simultaneous connectivity with more than one PGW for accessing multiple PDNs. The PGW 24 performs policy enforcement, packet filtering for each user, charging support, lawful Interception and packet screening. Another key role of the PGW 24 is to act as the anchor for mobility between 3GPP and non-3GPP technologies such as WiMAX and 3GPP2 (CDMA 1x and EvDO). The interface between the PGW 24 and the packet data network, being for instance the Internet, is referred to as the SGi.

In various embodiments of the present disclosure, the mobility anchor point may typically comprise the PGW 24. The message box $20_1$, $20_2$, residing at or above the mobility anchor node 24, may then be located at or above the SGi interface, and may for example be implemented in the PGW 26, the SCS 25, the MTC-IWF 28 or the MTC AAA 29. The message box $20_1$, $20_2$ may thus be co-located with any of the mentioned nodes or yet others, i.e. integrated with the node or as a part of the node. In other embodiments the message box $20_1$, $20_2$ is implemented as a standalone node located hierarchically seen as the mentioned nodes.

For embodiments providing messages boxes $20_1$, $20_2$ below the mobility anchor point 24, the message box $20_1$, $20_2$ may for example be located in the CGWs $14_1$, $14_2$ or in the radio access nodes $15_1$, $15_2$, or in the SGSN 27. A node below the mobility anchor node may be selected as the message box location for a slow moving or static MD $12_1, \ldots, 12_n$.

Above, only exemplary nodes wherein embodiments of the present disclosure may be implemented are provided. As is well known, the wireless network 16 comprises a number of additional nodes, such as Mobility Management Entity (MME) 22, involved in various task, for example in the bearer activation/deactivation process and is also responsible for choosing the SGW 26 for a CGW $14_1$, $14_2$ at the initial attach and at time of intra-LTE handover involving core network node relocation. Such additional nodes are illustrated in FIG. 3, but not described further herein. In the following, a node of the wireless network 16 is collectively referred to by reference numeral 30, and may thus comprise any one of the mentioned nodes or corresponding nodes of other communication systems.

Thus, in an aspect of the present disclosure, for a particular MD $12_1, \ldots, 12_n$, a first message box $20_1$ may be selected, that is located at or above a mobility anchor point or a second message box $20_2$ may be selected, that is located below the mobility anchor point. A first message box $20_1$, $20_2$ location being in the PGW and a second message box $20_2$ location being in the CGW $14_1$, $14_2$, respectively, comprising such examples. More generally, a first and a second location of the message boxes $20_1$, $20_2$ may be anywhere in the communication system 10.

For the case of multiple potential message boxes $20_1$, $20_2$ there are two issues to consider in order to allow communication between an application 19 and a MD $12_1, \ldots, 12_n$:

a) How the appropriate message box $20_1$, $20_2$ is to be chosen for a given MD $12_1, \ldots, 12_n$, and b) How the MD $12_1, \ldots, 12_n$, and application 19 get updated about the reachability information of the message box $12_1, \ldots, 12_n$, the reachability information e.g. comprising an IP address.

A first step of selecting the message box $20_1$, $20_2$ location is to determine the "CGW re-selection probability" (per MD $12_1, \ldots, 12_n$). This "CGW re-selection probability" may be calculated based on one or more of following parameters:

MD mobility

How many CGW choices; if only one CGW is reachable by the MD, then there is no a re-selection.

Changes of network dynamics and/or network load

History of previous CGW re-selection rates.

The MD $12_1, \ldots, 12_n$ mobility may be a value reflecting how often and how fast the MD $12_1, \ldots, 12_n$ changes its physical location. An MD $12_1, \ldots, 12_n$ that moves often and/or fast is more likely to end up in the range of another CGW $14_1$, $14_2$ (i.e. other than it previously communicated with) than a more static one. For example, an MD $12_1, \ldots, 12_n$ located in a restricted area of a building may have low mobility value whereas an MD $12_1, \ldots, 12_n$ moving within the entire building may have a high mobility value. Likewise, an MD $12_1, \ldots, 12_n$ being fixedly located would have zero mobility, while a MD $12_1, \ldots, 12_n$ attached to a car would, if the car does not have a CGW $14_1$, $14_2$ of its own, have a very high mobility value and thus a high CGW re-selection probability.

The number of CGW $14_1$, $14_2$ choices comprises all the CGWs $14_1$, $14_2$ that the MD $12_1, \ldots, 12_n$ can reach, either currently (at its current location) or in general. A high number of potential CGWs $14_1$, $14_2$ increases the likelihood of changing to another CGW $14_1$, $14_2$ and would hence result in high value for this "Number of CGW choices" metric, whereas the MD reaching only a single CGW $14_1$, $14_2$ would result in a low value, e.g. zero, and thus a low CGW re-selection probability.

The parameter, or set of parameters, relating to changes of network dynamics and/or load reflects how likely it is that the communication system 10 characteristics change so that changing to another CGW $14_1$, $14_2$ would be rational. In a highly dynamic communication system 10 (e.g., with unreliable links) it may be more rational to change between various CGWs $14_1$, $14_2$ than in a static setup where, once optimal setup is discovered, same CGWs $14_1$, $14_2$ should be used. A more dynamic communication system 10 would be given a higher value for this metric and thus high CGW re-selection probability.

History of previous CGW re-selection rates captures past behavior of CGW selection in order to help determine future behavior. If the MD $12_1, \ldots, 12_n$ has changed CGW $14_1$, $14_2$ often in the past, it is more likely to do this also in the future, and would hence be given a higher value for the metric and thus high CGW re-selection probability.

The above metrics and corresponding values can be combined, using e.g. a weighted average, into a single value that is then compared to a configurable threshold value. How to weight each value depends on the scenario, they may be weighted in such a way that the metrics having a higher chance of affecting the CGW selection probability are given more weight. As a particular example, if the CGWs have a short range, but are densely located, it would be rational to give the MD mobility parameter a high weight value, since in that case moving around frequently is likely to cause many CGW changes.

In an aspect of the present disclosure, a weight is thus given to one or more parameters depending on how well it correlates with the fact that an MD would change a CGW $14_1$, $14_2$ (i.e., how "important" or "relevant" this metric is for the particular MD). This weight may for instance comprise a value between 1 and 10. Then, the parameter values are multiplied with corresponding weights and the result divided by the sum of the weights, providing a weighted average.

As a particular example, the parameters A, B and C may have values between 0.0 and 1.0. Parameter A is given the weight 2 (i.e. perhaps not that important or relevant), parameter B is given the weight 6 and parameter C is given the weight 9 (likely very important and relevant). Then the CGW re-selection probability $P_{CGW}$ may be established by calculating:

$$P_{CGW}=(2*A+6*B+9*C)/(2+6+9)$$

This value $P_{CGW}$ would then be compared to the threshold value, which may be configured in view of the particular scenario at hand. The thresholds may be set based on empirical data correlating threshold values with desired behavior of the message box position selection algorithm. As another example, system simulations may be performed with different threshold values, and a threshold value be selected that optimizes performance in some sense, e.g. optimizes performance in terms of maximum sleep interval of the MD.

Once the CGW re-selection probability is calculated (per MD), a second step is to select message box (per MD). This may for example be done in line with:
If CGW reselection probability>threshold
  select message box $20_1$, $20_2$ at first location, e.g. in wireless network 16
Else
  select message box $20_1$, $20_2$ at second location, e.g. in CGW $14_1$,$14_2$.

The above steps may take place either once or periodically depending on the initial assumptions of the mobility pattern of the MD $12_1, \ldots, 12_n$. For example, if it is known that the MD $12_1, \ldots, 12_n$ is static (e.g. being an electricity meter) and it can always connect only to one and same CGW $14_1$, $14_2$ then the MD $12_1, \ldots, 12_n$ is configured once to use the message box $20_2$ on the CGW $14_1$, $14_2$. If the MD $12_1, \ldots, 12_n$ is potentially mobile then the appropriate message box $20_1$, $20_2$ for this MD $12_1, \ldots, 12_n$ depends on the parameters mentioned above and therefore the selection is dynamic and should be performed periodically. The periodicity may e.g. depend on the characteristics of the traffic to/from the MD $12_1, \ldots, 12_n$ from/to the application 19. The selection may alternatively or also be performed on demand, e.g. when there is some indication of need for reselection.

In the dynamic case the mobility/CGW change statistics are collected continuously. Such collection can be performed by the CNF 21 or by MD $12_1, \ldots, 12_n$ and then be pushed to the CNF 21 or other node implementing the selection mechanism according to an aspect of the present disclosure. The selection of the location of the message box per MD $12_1, \ldots, 12_n$ can be taken by the CNF 21.

After the appropriate message box $20_1$, $20_2$ has been selected by the CNF 21, the CNF 21 may send to the MD $12_1, \ldots, 12_n$ information on how to reach the message box, e.g. in the form of a uniform resource locator/Internet Protocol (URL/IP) address ("web address") of the message box $20_1$, $20_2$ so that the MD $12_1, \ldots, 12_n$ can update this reachability information as soon as possible and start using the selected message box.

Since there are potentially multiple unknown applications 19 that could use the MD $12_1, \ldots, 12_n$, the CNF 21 cannot update such unknown set of applications 19 about the reachability information of the message box $20_1$, $20_2$ for all the MDs $12_1, \ldots, 12_n$. A manageable solution for this is to use a Resource Directory or a similar functionality such as a Domain Name System (DNS). The Resource Directory maintains the reachability information of the current message box $20_1$, $20_2$ used by an MD $12_1, \ldots, 12_n$ given a unique identifier of the MD $12_1, \ldots, 12_n$. The MD $12_1, \ldots, 12_n$ may typically register with such resource directory. When the CNF 21 decides that the MD $12_1, \ldots, 12_n$ should be assigned to a different message box $20_1$, $20_2$ this Resource Directory or DNS server is updated accordingly.

Another issue to consider in the dynamic selection of the message box $20_1$, $20_2$ is how to handle the pending messages for MDs $12_1, \ldots, 12_n$ and for applications 19. In the following a few options are provided:

1) If the application 19 is always available then when the MD $12_1, \ldots, 12_n$ deposits a message for the application 19, the message is dispatched immediately so the message box does not contain any messages destined for applications. The messages destined to the MD $12_1, \ldots, 12_n$ can be handled in two ways:
  a. When the MD $12_n$ is decided (by the CNF) to be associated to a different message box than the current one, the pending MD messages can be transferred to the new message box and MD $12_1, \ldots, 12_n$ could be updated with the new reachability information when it wakes up.

b. An alternative is to for the MD $12_1, \ldots, 12_n$ to be keep the reachability information of both the old and new message box and check both until the old one is empty of messages for the MD $12_1, \ldots, 12_n$.

2) If the application is not always available then the message box may have MD-messages from the MD to applications (MD-to-app messages) and messages from applications to MDs (app-to-MD messages). Then the app-to-MD messages can be handled as 1a and 1b cases above while the MD-to-app message can be handled in a similar way:

a. The MD-to-app messages are forwarded to the new message box and the directory/DNS reachability information (for the current message box of the MD) is updated accordingly. This is easier for the application logic b. The MD-to-app messages remain in the old message box and the application is instructed to check both message boxes by the Directory/DNS server. The application is also instructed about which message box is the OLD and which is the NEW one so when the MD-to-app messages are retrieved from the OLD message box, the old one is not checked in the future. This requires the application logic to handle multiple message box reachability information responses by the resource directory/DNS server.

Figure 4:
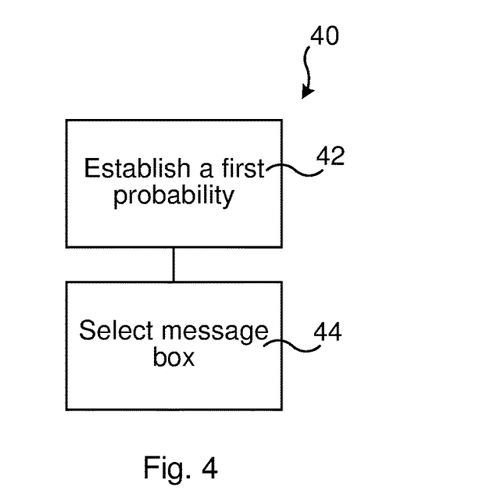
FIGS. 4 and 5 illustrate flow charts over steps of a method in a network node in accordance with the present disclosure.
Figure 5:
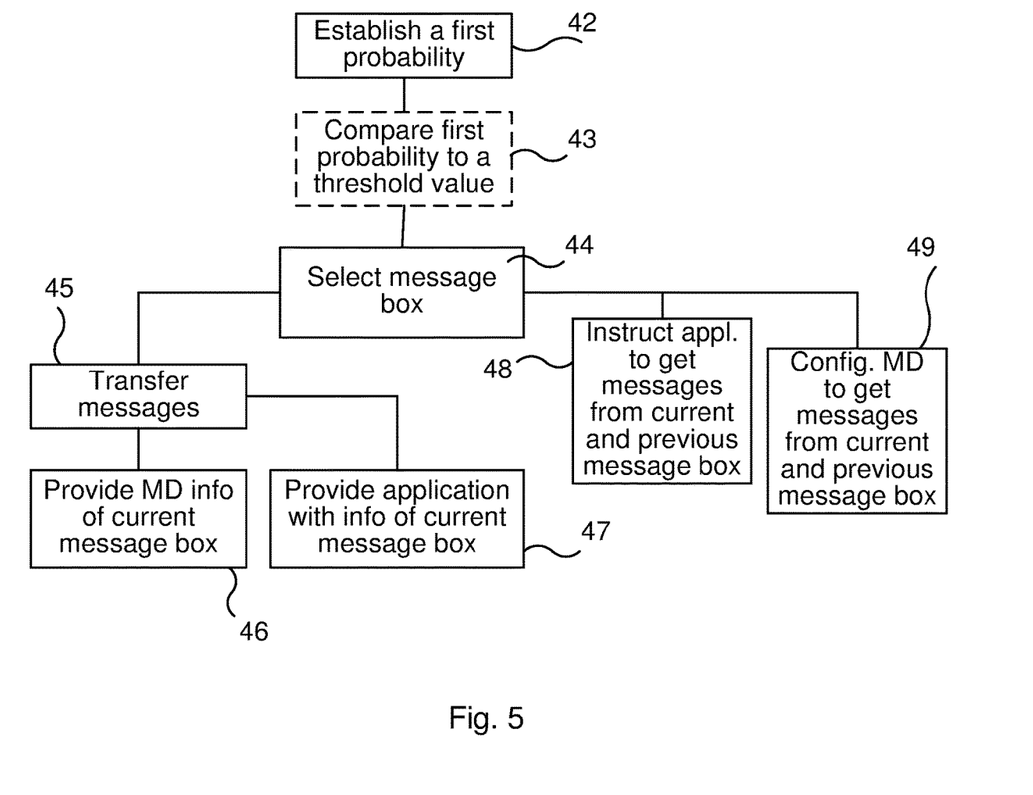

FIGS. 4 and 5 illustrate flow charts over steps of a method 40 in a node in accordance with the present disclosure. The method 40 is performed in a node $14_1, 14_2; 21$ of a communication system 10 for selecting a message box $20_1, 20_2$ for a machine device $12_1, \ldots, 12_n$. The communication system 10, e.g. as described in relation to FIG. 2, comprises one or more capillary networks 11 and a wireless network 16, wherein the one or more capillary networks 11 comprises one or more machine devices $12_1, \ldots, 12_n$ and at least two capillary network gateways $14_1, 14_2$. That is, there are at least two capillary network gateways $14_1, 14_2$ with which the machine device may communicate, and the capillary network gateways $14_1, 14_2$ may reside in the same capillary network or in different capillary networks. The at least two capillary network gateways $14_1, 14_2$ are capable of data exchange between the machine device $12_1, \ldots, 12_n$ and the wireless network 16. The method 40 comprises establishing 42, for the machine device $12_1, \ldots, 12_n$ a first probability reflecting the probability that the machine device $12_1, \ldots, 12_n$ changes capillary network gateway $14_1, 14_2$ between two consecutive data transmission events performed by the machine device $12_1, \ldots, 12_n$.

The establishing may comprise determining, e.g. calculating, in the node $14_1, 14_2; 21$ the first probability, or retrieving a value from a database. The establishing may, in other embodiments, comprise receiving or retrieving the first probability from another node, which has determined, e.g. calculated, the first probability.

The first probability reflects a capillary network gateway $14_1, 14_2$ reselection probability, and may e.g. reflect the probability that the machine device $12_1, \ldots, 12_n$ changes capillary network gateway $14_1, 14_2$ between two sleep mode periods, i.e. that it wakes up after having moved (during the sleep mode) to a location wherein another capillary network gateway $14_1, 14_2$ is more suitable for communication. The two consecutive data transmissions then comprise a data transmission performed before entering a sleep mode, and a subsequent data transmission performed after waking up from sleep mode. More generally, the first probability reflects the reselection probability of the machine device $12_1, \ldots, 12_n$ performing a data transmission using a first capillary network gateway $14_1, 14_2$ and then another transmission using a second capillary network gateway $14_1, 14_2$, i.e. changing capillary network gateway $14_1, 14_2$ between two consecutive data transmission events.

The method 40 comprises selecting 44, based on the first probability, a message box $20_1, 20_2$ for use by the machine device 12. The selection is, in various embodiments, performed in different ways.

The method 40 enables the machine devices $12_1, \ldots, 12_n$ to remain in a low power mode (i.e. an energy saving mode) for a longer duration by reducing, when possible, the round trip delay for its message box communication. In particular, the method selects a message box for the machine device $12_1, \ldots, 12_n$ depending on its probability to reselect capillary network gateway $14_1, 14_2$ between data transmissions; a machine device more likely to be using the same capillary network gateway uses a message box close to it, while a highly mobile machine device uses a message box higher up in the communication system 10. This provides a good tradeoff between the desire to have a message box close to the machine device (thus saving energy by reducing communication time periods), and the need to have information on reachability of the machine device. Another advantage is that network resources, e.g. in terms of processing resources, are saved when using few "hops" between the end parts of the communication.

In an embodiment, the establishing 42 comprises establishing the first probability based on one or more of following parameters: degree of mobility of the machine device $12_1, \ldots, 12_n$, speed of the machine device $12_1, \ldots, 12_n$, mobility frequency of the machine device $12_1, \ldots, 12_n$, number of capillary network gateways $14_1, 14_2$ reachable by the machine device $12_1, \ldots, 12_n$, load of the at least two capillary network gateways $14_1, 14_2$, rate of link quality changes on links between the machine device $12_1, \ldots, 12_n$ and the at least two capillary network gateways $14_1, 14_2$, historical data on the first probability, link quality of links between the at least two capillary network gateways $14_1, 14_2$ and a node in the wireless network 16. The exemplary parameters may be combined in various ways depending e.g. on the particular environment of the machine devices $12_1, \ldots, 12_n$ and its particular behavior. For example, the higher the number of capillary network gateways $14_1, 14_2$ that are potentially reachable by the machine device $12_1, \ldots, 12_n$ and the higher the mobility frequency of the machine device $12_1, \ldots, 12_n$ (i.e. the more often the machine device is configured to move), the higher the first probability is.

In a variation of the above embodiment, the establishing 42 comprises calculating a value for the first probability by providing each of the one or more parameters a weight corresponding to importance of the respective parameter, and establishing the first probability based on the weighted one or more parameters or a weighted average of them.

In an embodiment, as illustrated in FIG. 5, the selecting 44 comprises comparing 43 the first probability to a threshold value, and then selecting 44 a message box $20_1, 20_2$ based on the outcome of the comparison. The threshold value may be set in different ways, for example based on empirical data or system simulations as described earlier.

In an embodiment, as illustrated in FIG. 5, the selecting 44 comprises comparing 43 the first probability to a threshold value, and selecting 44 a message box $20_2$ having a first location within the communication system 10 when the first probability is higher than the threshold value, and else selecting a message box $20_1$ located at a second location within the communication system 10.

In an embodiment, being a particular case of the above embodiment, wherein the first location and the second location are selected in relation to a mobility anchor node. The selecting 44 then comprises comparing 43 the first probability to a threshold value, and selecting 44 a message box $20_2$ located below a mobility anchor point 24 of the wireless network 16 when the first probability is higher than the threshold value, and else selecting a message box $20_1$ located at or above the mobility anchor point 24. It is noted that, depending on how the threshold value is defined and set, the reverse outcome of the comparison could equally well be used. That is, when the first probability is lower than the threshold value, then a location below the mobility anchor point 24 is selected, else a location at or above the mobility anchor point is selected.

A message box $20_2$ located "below" the mobility anchor node is located in a node prior to, as seen in an uplink direction, the mobility anchor node 24 of the wireless network 16. Correspondingly, a message box $20_1$ located "at or higher than" the mobility anchor node is located in the mobility anchor node 24 or in a node beyond, as seen in the uplink direction, the mobility anchor node 24. This embodiment ensures that there are, at all times, reachability information of the machine device, since the mobility anchor node handles mobility related tasks and have location information of the machine devices, e.g. in form of latest known attachment node.

In an embodiment, the selecting 44 comprises comparing 43 the first probability to a threshold value, and selecting 44 a message box $20_2$ located in the capillary network gateway $14_1$, $14_2$ when the first probability is higher than the threshold value, and else selecting a message box $20_1$ located in a node 21 of the wireless network 16.

The method 40 also handles, in various embodiments, messages pending for the machine devices and applications. In an embodiment, the method 40 thus comprises dispatching to an application of an application server 18, a message from the message box $20_1$, $20_2$ upon reception thereof from the machine device $12_1$, ..., $12_n$. This is an embodiment suitable e.g. when the application is always available. The machine device deposits a message (e.g. resource data, a message destined to a network entity, e.g. the application server 18 or a message to another MD) for the application and the message is dispatched immediately, thereby the message box does not contain any messages destined for applications, which inter alia saves memory resources.

In an embodiment (refer to FIG. 5), the method comprises, for a machine device $12_1$, ..., $12_n$ for which a previous message box $20_1$ has changed to a current message box $20_2$ since its last data transmission event:
transferring 45 messages pending for the machine device 12 from the previous message box $20_1$ to the current message box $20_2$, and
providing 46 the machine device $12_1$, ..., $12_n$ with location information of the current message box $20_2$.

In an embodiment (refer to FIG. 5), the method 40 comprises, for a machine device $12_1$, ..., $12_n$ for which a previous message box $20_1$ has changed to a current message box $20_2$ since its last data transmission event, configuring 49 the machine device $12_1$, ..., $12_n$ to retrieve messages from the current message box $20_2$ and the previous message box $20_1$.

In an embodiment, the method 40 comprises for an application 19, e.g. of an application server 18, requiring data from a machine device $12_1$, ..., $12_n$ for which a previous message box $20_1$ has changed to a current message box $20_2$ since its last data transmission event:
transferring 45 messages pending for the application 19 from the previous message box $20_1$ to the current message box $20_2$, and
providing 47 the application 19 with location information of the current message box $20_2$.

In an embodiment, the method 40 comprises, for an application requiring data from a machine device $12_1$, ..., $12_n$ for which a previous message box $20_1$ has changed to a current message box $20_2$ since its last data transmission event, instructing 48 the application 19 to retrieve messages from the current message box $20_2$ and the previous message box $20_1$.

Figure 6:
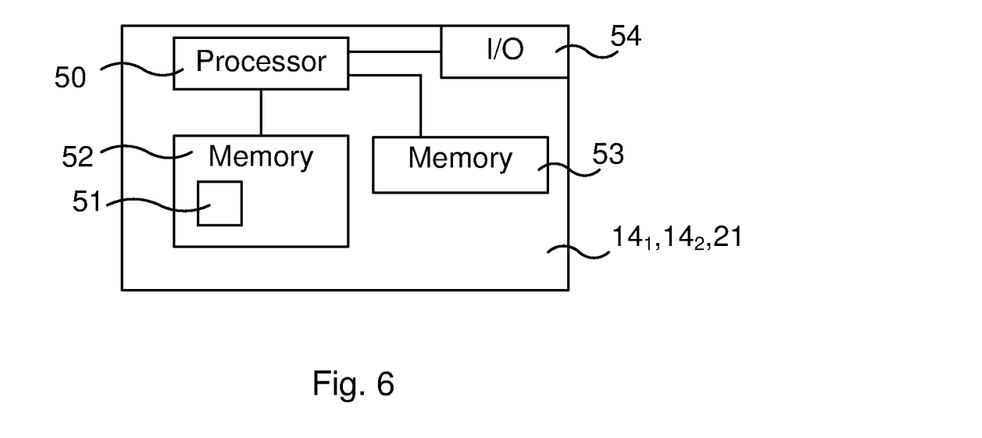
FIG. 6 illustrates schematically a node and means for implementing methods of the present disclosure.

FIG. 6 illustrates schematically a node $14_1$, $14_2$; 21 and means for implementing methods of the present disclosure. The node $14_1$, $14_2$; 21 comprises a processor 50 comprising any combination of one or more of a central processing unit (CPU), multiprocessor, microcontroller, digital signal processor (DSP), application specific integrated circuit etc. capable of executing software instructions stored in a memory 52, which can thus be a computer program product 52. The processor 50 can be configured to execute any of the various embodiments of the method as described, e.g. in relation to FIGS. 4 and 5, or generally any of the functions as has been described.

The memory 52 can be any combination of read and write memory (RAM) and read only memory (ROM). The memory 52 also comprises persistent storage, which, for example, can be any single one or combination of magnetic memory, optical memory, solid state memory or even remotely mounted memory.

The node $14_1$, $14_2$; 21 may further comprise a data memory 53 for reading and/or storing data during execution of software instructions in the processor 50. The data memory 53 can be any combination of read and write memory (RAM) and read only memory (ROM).

The node $14_1$, $14_2$; 21 further comprises one or more input/output (I/O) devices 54 (only one illustrated) for communicating with other entities within the capillary network 11 and/or within the wireless network 15. For example, when the node comprises the CGW $14_1$, $14_2$, then the I/O 54 may comprise a first interface device for communication with the MDs $12_1$, ..., $12_n$ (e.g. a Bluetooth interface) and a second interface device for communication with the wireless network 16, and in particular an access node thereof, e.g. eNB $15_1$, $15_2$, the second interface may thus comprise an LTE interface.

Depending on type of node, it may comprise still further means and devices, e.g. antenna circuitry if the node is a CGW $12_1$, $12_2$ or an access node (e.g. eNB $15_1$, $15_2$).

The node $14_1$, $14_2$; 21 can be configured to perform any of the embodiments of the method as described, e.g. in relation to FIGS. 4 and 5. Thus, the present disclosure provides a node $14_1$, $14_2$; 21 of a communication system 10 configured to select a message box $20_1$, $20_2$ for a machine device $12_1$, ..., $12_n$. The communication system 10 comprises one or more capillary networks 11 and a wireless network 16, wherein the one or more capillary networks 11 comprise(s) one or more machine devices $12_1$, ..., $12_n$ and at least two capillary network gateways $14_1$, $14_2$. The at least two capillary network gateways $14_1$, $14_2$ are capable of data exchange between the machine device $12_1$, ..., $12_n$ and the wireless network 16. The node $14_1$, $14_2$; 21 comprises a processor 50 and memory 52, the memory 52 containing instructions executable by the processor 50, whereby the node $14_1$, $14_2$; 21 is operative to:
establish, for the machine device $12_1$, ..., $12_n$, a first probability reflecting the probability that the machine device $12_1, \ldots, 12_n$ changes capillary network gateway $14_1$, $14_2$ between two consecutive data transmission events performed by the machine device $12_1, \ldots, 12_n$, and select, based on the first probability, a message box $20_1$, $20_2$ for use by the machine device $12_1, \ldots, 12_n$.

In an embodiment, the node is configured to establish by establishing the first probability based on one or more of following parameters: degree of mobility of the machine device $12_1, \ldots, 12_n$, speed of the machine device $12_1, \ldots, 12_n$, mobility frequency of the machine device $12_1, \ldots, 12_n$, number of capillary network gateways $14_1$, $14_2$ reachable by the machine device $12_1, \ldots, 12_n$, load of the at least two capillary network gateways $14_1$, $14_2$, rate of link quality changes on links between the machine device $12_1, \ldots, 12_n$ and the at least two capillary network gateways $14_1$, $14_2$, historical data on the first probability, link quality of links between the at least two capillary network gateways $14_1$, $14_2$ and a node in the wireless network 16.

In a variation of the above embodiment, the node is configured to establish by calculating a value for the first probability by:

providing each of the one or more parameters a weight corresponding to importance of the respective parameter, and establishing the first probability based on the weighted one or more parameters.

In an embodiment, the node is configured to select by:
comparing the first probability to a threshold value, and selecting a message box $20_1$, $20_2$ based on the outcome of the comparison.

In an embodiment, the node is configured to select by:
comparing the first probability to a threshold value, and selecting a message box $20_2$ having a first location within the communication system 10 when the first probability is higher than the threshold value, and else selecting a message box $20_1$ located at a second location within the communication system 10.

In an embodiment, the node is configured to select by:
comparing the first probability to a threshold value, and selecting a message box $20_2$ located below a mobility anchor point 24 of the wireless network 16 when the first probability is higher than the threshold value, and else selecting a message box $20_1$ located at or above the mobility anchor point 24.

In an embodiment, the node is configured to select by:
comparing the first probability to a threshold value, and selecting a message box $20_2$ located in the capillary network gateway $14_1$, $14_2$ when the first probability is higher than the threshold value, and else selecting a message box $20_1$ located in a node 21 of the wireless network 16.

In an embodiment, the node is configured to dispatch to an application of an application server 18, a message from the message box $20_1$, $20_2$ upon reception thereof from the machine device $12_1, \ldots, 12_n$.

In an embodiment, the node is configured to, for a machine device $12_1, \ldots, 12_n$ for which a previous message box $20_1$ has changed to a current message box $20_2$ since its last data transmission event:

transfer messages pending for the machine device 12 from the previous message box $20_1$ to the current message box $20_2$, and provide the machine device $12_1, \ldots, 12_n$ with location information of the current message box $20_2$.

In an embodiment, the node is configured to, for a machine device 12 for which a previous message box $20_1$ has changed to a current message box $20_2$ since its last data transmission event, configure the machine device $12_1, \ldots, 12_n$ to retrieve messages from the current message box $20_2$ and the previous message box $20_1$.

In an embodiment, the node is configured to for an application 19 of an application server 18 requiring data from a machine device $12_1, \ldots, 12_n$ for which a previous message box $20_1$ has changed to a current message box $20_2$ since its last data transmission event:

transfer messages pending for the application 19 from the previous message box $20_1$ to the current message box $20_2$, and provide the application 19 with location information of the current message box $20_2$.

In an embodiment, the node is configured to, for an application requiring data from a machine device $12_1, \ldots, 12_n$ for which a previous message box $20_1$ has changed to a current message box $20_2$ since its last data transmission event, instruct the application 19 to retrieve messages from the current message box $20_2$ and the previous message box $20_1$.

The present disclosure further provides a computer program 52 for a node $14_1$, $14_2$; 21 of a communication system 10 for selecting a message box $20_1$, $20_2$ for a machine device $12_1, \ldots, 12_n$, the communication system 10 comprising one or more capillary networks 11 and a wireless network 16, wherein the one or more capillary networks comprise one or more machine devices $12_1, \ldots, 12_n$ and at least two capillary network gateways $14_1$, $14_2$. The at least two capillary network gateways $14_1$, $14_2$ are capable of data exchange between the machine device $12_1, \ldots, 12_n$ and the wireless network 16. The computer program 51 comprises computer program code, which, when run on the node $14_1$, $14_2$; 21 causes the node $14_1$, $14_2$; 21 to:

establish, for the machine device $12_1, \ldots, 12_n$, a first probability reflecting the probability that the machine device $12_1, \ldots, 12_n$ changes capillary network gateway $14_1$, $14_2$ between two consecutive data transmission events performed by the machine device $12_1, \ldots, 12_n$, and select, based on the first probability, a message box $20_1$, $20_2$ for use by the machine device 12.

The present disclosure further encompasses the earlier mentioned computer program product 52 comprising the computer program 51 as above, and a computer readable means on which the computer program 51 is stored.

The computer program product 52, or the memory, thus comprises instructions executable by the processor. Such instructions may be comprised in a computer program, or in one or more software modules or function modules.

Figure 7:
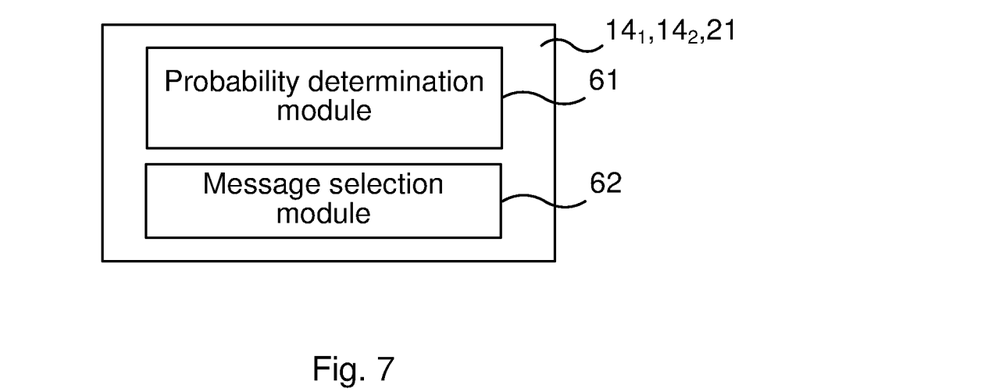
FIG. 7 illustrates a network node comprising functions modules/software modules for implementing methods of the present disclosure.

An example of an implementation using function modules and/or software modules is illustrated in FIG. 7, in particular illustrating a node comprising such means for implementing embodiments of the described method. FIG. 7 thus illustrates a node $14_1$, $14_2$; 21 of a communication system 10 for selecting a message box $20_1$, $20_2$ for a machine device 12, the communication system 10 comprising one or more capillary networks 11 comprising at least two capillary network gateways $14_1$, $14_2$. The node $14_1$, $14_2$; 21 comprises first means 61 for establishing, for the machine device $12_1, \ldots, 12_n$, a first probability reflecting the probability that the machine device $12_1, \ldots, 12_n$ changes capillary network gateway $14_1$, $14_2$ between two consecutive data transmission events performed by the machine device $12_1, \ldots, 12_n$.

The node $14_1$, $14_2$; 21 comprises second means 62 for selecting, based on the first probability, a message box $20_1$, $20_2$ for use by the machine device $12_1, \ldots, 12_n$.

The first and second means 61, 62, e.g. functional modules, can be implemented using software instructions such as computer program executing in a processor and/or using hardware, such as application specific integrated circuits, field programmable gate arrays, discrete logical components etc.

The node 14₁, 14₂; 21 may comprise still further such means for implementing any of the embodiments of the method as has been described. For example, third means (not explicitly illustrated in the FIG. 7) may be provided for selecting by comparing the first probability to a threshold value, and selecting a message box 20₂ having a first location within the communication system 10 when the first probability is higher than the threshold value, and else selecting a message box 20₁ located at a second location within the communication system 10. The first location may e.g. comprise a node located below a mobility anchor point and the second location may e.g. comprise a node located at or above the mobility anchor point.

Modifications of the disclosed embodiments and other embodiments will come to mind to one skilled in the art having the benefit of the teachings presented in the foregoing descriptions and the associated drawings. Therefore, it is to be understood that the disclosure(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method performed in a node of a communication system for selecting a message box for a machine device, the communication system comprising one or more capillary networks and a wireless network, the one or more capillary networks comprising one or more machine devices and at least two capillary network gateways, the at least two capillary network gateways being capable of data exchange between the machine device and the wireless network, the method comprising:
    establishing, for the machine device, a first probability reflecting the probability that the machine device changes capillary network gateway between two consecutive data transmission events performed by the machine device, the first probability calculated based on one or more parameters each associated with a weight corresponding to an importance of the respective parameter in establishing the first probability; and
    selecting, based on the first probability, a message box for use by the machine device.

2. The method as claimed in claim 1, wherein establishing the first probability is based on one or more of the following parameters: degree of mobility of the machine device, speed of the machine device, mobility frequency of the machine device, number of capillary network gateways reachable by the machine device, load of the at least two capillary network gateways, rate of link quality changes on links between the machine device and the at least two capillary network gateways, historical data on the first probability, link quality of links between the at least two capillary network gateways and a node in the wireless network.

3. The method as claimed in claim 2, further comprising providing each of the one or more parameters a weight corresponding to importance of the respective parameter.

4. The method as claimed in claim 1, wherein the selecting comprises:
    comparing the first probability to a threshold value, and selecting a message box based on the outcome of the comparison.

5. The method as claimed in claim 1, wherein the selecting comprises:
    comparing the first probability to a threshold value; and
    selecting a message box having a first location within the communication system when the first probability is higher than the threshold value, and else selecting a message box located at a second location within the communication system.

6. The method as claimed in claim 1, wherein the selecting comprises:
    comparing the first probability to a threshold value; and
    selecting a message box located below a mobility anchor point of the wireless network when the first probability is higher than the threshold value, and else selecting a message box located at or above the mobility anchor point.

7. The method as claimed in claim 1, wherein the selecting comprises:
    comparing the first probability to a threshold value; and
    selecting a message box located in the at least two capillary network gateways when the first probability is higher than the threshold value, and else selecting a message box located in a node of the wireless network.

8. The method as claimed in claim 1, comprising dispatching to an application of an application server, a message from the message box upon reception thereof from the machine device.

9. The method as claimed in claim 1, comprising, for a machine device for which a previous message box has changed to a current message box since its last data transmission event:
    transferring messages pending for the machine device from the previous message box to the current message box; and
    providing the machine device with location information of the current message box.

10. The method as claimed in claim 1, comprising, for a machine device for which a previous message box has changed to a current message box since its last data transmission event, configuring the machine device to retrieve messages from the current message box and the previous message box.

11. The method as claimed in claim 1, comprising, for an application of an application server requiring data from a machine device for which a previous message box has changed to a current message box since its last data transmission event:
    transferring messages pending for the application from the previous message box to the current message box; and
    providing the application with location information of the current message box.

12. The method as claimed in claim 1, comprising, for an application requiring data from a machine device for which a previous message box has changed to a current message box since its last data transmission event, instructing the application to retrieve messages from the current message box and the previous message box.

13. A node of a communication system configured to select a message box for a machine device, the communication system comprising one or more capillary networks and a wireless network, the one or more capillary networks comprising one or more machine devices and at least two capillary network gateways, the at least two capillary network gateways being capable of data exchange between the machine device and the wireless network, the node comprising a processor and a computer-readable storage medium containing instructions which, when executed by the processor, cause the node to:
   establish, for the machine device, a first probability reflecting the probability that the machine device changes capillary network gateway between two consecutive data transmission events performed by the machine device, the first probability calculated based on a set of parameters each associated with a weight corresponding to an importance of the respective parameter in establishing the first probability; and
   select, based on the first probability, a message box for use by the machine device.

14. The node as claimed in claim 13, wherein the first probability is established based on one or more of the following parameters: degree of mobility of the machine device, speed of the machine device, mobility frequency of the machine device, number of capillary network gateways reachable by the machine device, load of the at least two capillary network gateways, rate of link quality changes on links between the machine device and the at least two capillary network gateways, historical data on the first probability, link quality of links between the at least two capillary network gateways and a node in the wireless network.

15. The node as claimed in claim 14, wherein the instructions, when executed by the processor, further cause the node to:
   receive input specifying the weight for each of the one or more parameters corresponding to importance of the respective parameter.

16. The node as claimed in claim 13, wherein the selection of the message box comprises the node being caused to:
   compare the first probability to a threshold value, and select a message box based on the outcome of the comparison.

17. The node as claimed in claim 13, wherein the selection of the message box comprises the node being caused to:
   compare the first probability to a threshold value; and
   select a message box having a first location within the communication system when the first probability is higher than the threshold value, and else select a message box located at a second location within the communication system.

18. The node as claimed in claim 13, wherein the selection of the message box comprises the node being caused to:
   compare the first probability to a threshold value; and
   select a message box located below a mobility anchor point of the wireless network when the first probability is higher than the threshold value, and else select a message box located at or above the mobility anchor point.

19. The node as claimed in claim 13, wherein the selection of the message box comprises the node being caused to:
   compare the first probability to a threshold value; and
   select a message box located in the capillary network gateway when the first probability is higher than the threshold value, and else selecting a message box located in a node of the wireless network.

20. The node as claimed in claim 13, wherein the instructions, when executed by the processor, further cause the node to: dispatch, to an application of an application server, a message from the message box upon reception thereof from the machine device.

21. The node as claimed in claim 13, wherein the instructions, when executed by the processor, further cause the node to, for a machine device for which a previous message box has changed to a current message box since its last data transmission event:
   transfer messages pending for the machine device from the previous message box to the current message box; and
   provide the machine device with location information of the current message box.

22. The node as claimed in claim 13, wherein the instructions, when executed by the processor, further cause the node to, for a machine device for which a previous message box has changed to a current message box since its last data transmission event, configure the machine device to retrieve messages from the current message box and the previous message box.

23. The node as claimed in claim 13, wherein the instructions, when executed by the processor, further cause node to, for an application of an application server requiring data from a machine device for which a previous message box has changed to a current message box since its last data transmission event:
   transfer messages pending for the application from the previous message box to the current message box; and
   provide the application with location information of the current message box.

24. The node as claimed in claim 13, wherein the instructions, when executed by the processor, cause the node to, for an application requiring data from a machine device for which a previous message box has changed to a current message box since its last data transmission event, instruct the application to retrieve messages from the current message box and the previous message box.

25. A non-transitory computer readable storage medium storing instructions for a node of a communication system for selecting a message box for a machine device, the communication system comprising one or more capillary networks and a wireless network, wherein the one or more capillary networks comprises one or more machine devices and at least two capillary network gateways, the at least two capillary network gateways being capable of data exchange between the machine device and the wireless network, the instructions which, when executed by a processor of the node, cause the node to:
   establish, for the machine device, a first probability reflecting the probability that the machine device changes capillary network gateway between two consecutive data transmission events performed by the machine device, the first probability calculated based on one or more parameters each associated with a weight corresponding to an importance of the respective parameter in establishing the first probability; and
   select, based on the first probability, a message box for use by the machine device.

26. The non-transitory computer readable storage medium as claimed in claim 25, wherein the first probability is established based on one or more of the following parameters: degree of mobility of the machine device, speed of the machine device, mobility frequency of the machine device, number of capillary network gateways reachable by the machine device, load of the at least two capillary network gateways, rate of link quality changes on links between the machine device and the at least two capillary network gateways, historical data on the first probability, link quality of links between the at least two capillary network gateways and a node in the wireless network.

27. The non-transitory computer readable storage medium as claimed in claim 25, wherein the instructions, when executed by the processor, further cause the node to:
receive input specifying the weight for each of the one or more parameters corresponding to importance of the respective parameter.

28. The non-transitory computer readable storage medium as claimed in claim 25, wherein the selection of the message box comprises the node being caused to:
compare the first probability to a threshold value, and selecting a message box based on the outcome of the comparison.

29. The non-transitory computer readable storage medium as claimed in claim 25, wherein the selection of the message box comprises the node being caused to:
compare the first probability to a threshold value; and
select a message box having a first location within the communication system when the first probability is higher than the threshold value, and else selecting a message box located at a second location within the communication system.

30. The non-transitory computer readable storage medium as claimed in claim 25, wherein the selection of the message box comprises the node being caused to:
compare the first probability to a threshold value; and
select a message box located below a mobility anchor point of the wireless network when the first probability is higher than the threshold value, and else selecting a message box located at or above the mobility anchor point.

31. The non-transitory computer readable storage medium as claimed in claim 25, wherein the selection of the message box comprises the node being caused to:
compare the first probability to a threshold value; and
select a message box located in the at least two capillary network gateways when the first probability is higher than the threshold value, and else selecting a message box located in a node of the wireless network.

32. The non-transitory computer readable storage medium as claimed in claim 25, wherein the instructions, when executed by the processor, further cause the node to dispatch to an application of an application server, a message from the message box upon reception thereof from the machine device.

33. The non-transitory computer readable storage medium as claimed in claim 25, wherein the instructions, when executed by the processor, further cause the node to, for a machine device for which a previous message box has changed to a current message box since its last data transmission event:
transfer messages pending for the machine device from the previous message box to the current message box; and
provide the machine device with location information of the current message box.

34. The non-transitory computer readable storage medium as claimed in claim 25, wherein the instructions, when executed by the processor, further cause the node to, for a machine device for which a previous message box has changed to a current message box since its last data transmission event, configure the machine device to retrieve messages from the current message box and the previous message box.

35. The non-transitory computer readable storage medium as claimed in claim 25, wherein the instructions, when executed by the processor, further cause the node to, for an application of an application server requiring data from a machine device for which a previous message box has changed to a current message box since its last data transmission event:
transfer messages pending for the application from the previous message box to the current message box; and
provide the application with location information of the current message box.

36. The non-transitory computer readable storage medium as claimed in claim 25, wherein the instructions, when executed by the processor, further cause the node to, for an application requiring data from a machine device for which a previous message box has changed to a current message box since its last data transmission event, instruct the application to retrieve messages from the current message box and the previous message box.

37. A node of a communication system for selecting a message box for a machine device, the communication system comprising one or more capillary networks comprising at least two capillary network gateways, the node comprising:
means for establishing, for the machine device, a first probability reflecting the probability that the machine device changes capillary network gateway between two consecutive data transmission events performed by the machine device, the first probability calculated based on one or more parameters each associated with a weight corresponding to an importance of the respective parameter in establishing the first probability; and
means for selecting, based on the first probability, a message box for use by the machine device.

* * * * *

UNITED STATES PATENT AND TRADEMARK OFFICE
CERTIFICATE OF CORRECTION

PATENT NO. : 10,511,660 B2
APPLICATION NO. : 15/120493
DATED : December 17, 2019
INVENTOR(S) : Keranen et al.

Page 1 of 1

It is certified that error appears in the above-identified patent and that said Letters Patent is hereby corrected as shown below:

On the Title Page

In Item (72), under "Inventors", in Column 1, Lines 2, delete "Kirkonummi" and insert -- Kirkkonummi --, therefor.

In the Specification

In Column 1, Line 67, delete "$4_4$, $4_2$" and insert -- $4_1$, $4_2$ --, therefor.

In Column 2, Line 29, delete "at is" and insert -- at its --, therefor.

In Column 5, Line 15, delete "$14_1$, $4_2$." and insert -- $14_1$, $14_2$. --, therefor.

In Column 5, Line 17, delete "$14_1$, $13_2$," and insert -- $14_1$, $14_2$, --, therefor.

In Column 5, Line 47, delete "$14_1$, $4_2$." and insert -- $14_1$, $14_2$. --, therefor.

In Column 6, Line 49, delete "$140_{42}$." and insert -- $14_1$, $14_2$. --, therefor.

In Column 6, Line 55, delete "(RIM." and insert -- (RTT). --, therefor.

In Column 7, Line 31, delete "Packet Service" and insert -- Packet Radio Service --, therefor.

In Column 7, Line 44, delete "Packet Service" and insert -- Packet Radio Service --, therefor.

In Column 10, Line 65, delete "$12_n$" and insert -- $12_1,...,12_n$ --, therefor.

In Column 11, Line 44, delete "$12_1,....,12_n$" and insert -- $12_1,....,12_n$, --, therefor.

In Column 16, Line 27, delete "networks" and insert -- networks 11 --, therefor.

Signed and Sealed this
Twenty-sixth Day of May, 2020

Andrei Iancu
*Director of the United States Patent and Trademark Office*